United States Patent
Gilkey et al.

(10) Patent No.: US 10,194,674 B2
(45) Date of Patent: *Feb. 5, 2019

(54) NUTRITIONAL COMPOSITIONS

(71) Applicants: John C. Gilkey, Tucson, AZ (US); Cynthia Dowdall-Thomae, Tucson, AZ (US); Elton Clark, Jr., Tucson, AZ (US)

(72) Inventors: John C. Gilkey, Tucson, AZ (US); Cynthia Dowdall-Thomae, Tucson, AZ (US); Elton Clark, Jr., Tucson, AZ (US)

( * ) Notice: Subject to any disclaimer, the term of this patent is extended or adjusted under 35 U.S.C. 154(b) by 56 days.

This patent is subject to a terminal disclaimer.

(21) Appl. No.: 15/675,056

(22) Filed: Aug. 11, 2017

(65) Prior Publication Data
US 2017/0339972 A1  Nov. 30, 2017

Related U.S. Application Data (63) Continuation-in-part of application No. 14/054,569, filed on Oct. 15, 2013, now Pat. No. 9,730,462, which is a continuation of application No. 13/601,005, filed on Aug. 31, 2012, now abandoned.

(60) Provisional application No. 61/530,339, filed on Sep. 1, 2011.

(51) Int. Cl.
| | |
|---|---|
| A23L 1/29 | (2006.01) |
| A23F 3/14 | (2006.01) |
| A23L 33/175 | (2016.01) |
| A23L 33/16 | (2016.01) |
| A23L 33/105 | (2016.01) |
| A23L 29/25 | (2016.01) |
| A23L 2/39 | (2006.01) |
| A23L 2/68 | (2006.01) |
| A23L 2/52 | (2006.01) |
| A23F 3/16 | (2006.01) |

(52) U.S. Cl.
CPC ............. *A23F 3/14* (2013.01); *A23F 3/163* (2013.01); *A23L 2/39* (2013.01); *A23L 2/52* (2013.01); *A23L 2/68* (2013.01); *A23L 29/25* (2016.08); *A23L 33/105* (2016.08); *A23L 33/16* (2016.08); *A23L 33/175* (2016.08)

(58) Field of Classification Search
CPC .................... A23F 3/14; A23L 33/105
USPC .................... 426/2, 590, 597, 648
See application file for complete search history.

(56) References Cited

U.S. PATENT DOCUMENTS

| | | |
|---|---|---|
| 6,210,738 B1 | 4/2001 | Chen |
| 2002/0136802 A1 | 9/2002 | Mehansho et al. |
| 2005/0176827 A1 | 8/2005 | Lee et al. |

(Continued)

FOREIGN PATENT DOCUMENTS

| | | |
|---|---|---|
| WO | 2009099628 | 8/2009 |

OTHER PUBLICATIONS

Selye H. 1985. The Nature of Stress. Basal Facts. 7(1):3-11, 1985.

(Continued)

*Primary Examiner* — Helen F Heggestad
(74) *Attorney, Agent, or Firm* — Gavin J. Milczarek-Desai; Quarles & Brady LLP (57) ABSTRACT

Nutritional compositions for general stress reduction and recovery from stress containing certain amounts of five key ingredients: creatine, EGCG, L-carnitine, lemon balm (*Melissa officinalis*) essential oil, and passionflower (*Passiflora incarnata*) essential oil. Methods of reducing stress utilizing said compositions also is disclosed.

11 Claims, 3 Drawing Sheets

(56) References Cited

U.S. PATENT DOCUMENTS

| | | |
|---|---|---|
| 2010/0316768 A1 | 12/2010 | Stillman |
| 2011/0110919 A1 | 5/2011 | Gerhardt et al. |
| 2011/0293787 A1 | 12/2011 | Pons Biescas et al. |
| 2012/0308525 A1 | 12/2012 | Greenberg et al. |

OTHER PUBLICATIONS

Chrousos G.P. 2009. Stress and disorders of the stress system. http://www.nature.com/nrendo/journall/v5/n7/full/nrendo.2009.106.html (Accessed Jul. 10, 2011).

Schmidt U. Holsboer F. and Rein T. 2011. Epigenetic aspects of posttraumatic stress disorder. Disease Markers. 30:77-87.

Weaver IC. 2009. Epigenetic effects of glucocorticoids. Seminars in Fetal & Neonatal Medicine. 14(3):143-50.

Baccarelli A., Cassano PA., Litonjua A., Park SK., Suh H., Sparrow D., Vokonas P. and Schwartz J. 2008. Cardiac autonomic dysfunction: effects from particulate air pollution and protection by dietary methyl nutrients and metabolic polymorphisms. Circulation. 117(14):1802-9.

Murakami K., Mizoue T., Sasaki S., Ohta M., Sato M., Matsushita Y. and Mishima N. 2008. Dietary intake of folate, other B vitamins, and omega-3 polyunsaturated fatty acids in relation to depressive symptoms in Japanese adults. Nutrition. 24(2):140-7.

Sanchez-Villegas A., Doreste J., Schlatter J., Pia J., Bes-Rastrollo M. and Martinez-Gonzalez MA. 2009. Association between folate, vitamin B(6) and vitamin B(12) intake and depression in the SUN cohort study. Journal of Human Nutrition & Dietetics. 22(2):122-33.

Depeint F., Bruce WR., Shangari N., Mehta R. and O'Brien PJ. 2006. Mitochondrial function and toxicity: role of the B vitamin family on mitochondrial energy metabolism. Chemico-BiologicalInteractions. 163(1-2):94-112.

Stiefel P., Arguelles S., Garcia S., Jimenez L, Aparicio R., Cameado J., Machado A. and Ayala A. 2005. Effects of short-term supplementation with folic acid on different oxidative stress parameters in patients with hypertension. Biochimica et Biophysics Acta. 1726(2):152-9.

Anyanwu EC., Ehiri JE. and Kanu I. 2005. Biochemical evaluation of antioxidant function after a controlled optimum physical exercise among adolescents. International Journal of Adolescent Medicine & Health. 17(1):57-66.

Lorenz M., Urban J., Engelhardt U., Baumann G., Stangl K. and Stangl V. 2009. Green and black tea are equally potent stimuli of NO production and vasodilation: new insights into tea ingredients involved. Basic Research in Cardiology. 104(1):100-10.

Steptoe A., Gibson EL., Vuononvirta R., Williams ED., Hamer M., Rycroft JA., Erusalimsky JD. and Wardle J. 2007. The effects of tea on psychophysiological stress responsivity and post-stress recovery: a randomised double-blind trial. Psychopharmacology. 190(1):81-9.

Mamus RT.. Dos Santos MG., Campbell B. and Kreider R. 2006. Biochemical effects of carbohydrate supplementation in a simulated competition of short terrestrial duathlon. Journal of the International Society of Sports Nutrition. 3:6-11.

McAnulty S., McAnulty L., Nieman D., Morrow J. and Dumke C. Utter A. 2007. Carbohydrate effect: hormone and oxidative changes. International Journal of Sports Medicine. 28(11):921-7.

Utter AC., Kang J., Nieman DC., Dumke CL., McAnulty Sr. and McAnulty LS. 2007. Carbohydrate attenuates perceived exertion during intermittent exercise and recovery. Medicine & Science in Sports & Exercise. 39(5):880-5.

Morgan CA 3rd., Hazlett G., Southwick S., Rasmusson A. and Lieberman HR. 2009. Effect of carbohydrate administration on recovery from stress-induced deficits in cognitive function: a double-blind, placebo-controlled study of soldiers exposed to survival school stress. Military Medicine. 17 4(2): 132-8.

Sugino T., Aoyagi S., Shirai T., Kajimoto Y. and Kajimoto 0. 2007. Effects of Citric Acid and 1-Carnitine on Physical Fatigue. Journal of Clinical Biochemistry & Nutrition. 41 (3):224-30.

McMorris T., Harris RC., Swain J., Corbett J., Collard K., Dyson RJ., Dye L., Hodgson C. and Draper N. 2006. Effect of creatine supplementation and sleep deprivation, with mild exercise, on cognitive and psychomotor performance, mood state, and plasma concentrations of catecholamine& and cortisol. Psychopharmacology. 185(1):93-103.

McMorris T., Harris RC., Howard AN., Langridge G., Hall B., Corbett J., Dicks M. and Hodgson C. 2007. Creatine supplementation, sleep deprivation, cortisol, melatonin and behavior. Physiology & Behavior. 90(1):21-8.

Burke DG., Candow DG., Chilibeck PD., MacNeil LG., Roy BD., Tarnopolsky MA. and Ziegenfuss T. 2008. Effect of creatine supplementation and resistance-exercise training on muscle insulin-like growth factor in young adults. International Journal of Sport Nutrition & Exercise Metabolism. 18(4):389-98, Aug. 2008.

Chilibeck PD., Magnus C. and Anderson M. 2007. Effect of in-season creatine supplementation on body composition and performance in rugby union football players. Applied Physiology, Nutrition, & Metabolism = Physiologie Appliquee, Nutrition et Metabolisme. 32(6):1052-7.

Hoffman Jr., Stout Jr., Falvo MJ .• Kang J. and Ratamess NA. 2005. Effect of low-dose, short-duration creatine supplementation on anaerobic exercise performance. Journal of Strength & Conditioning Research. 19(2):260-4.

Okudan N. and Gokbel H. 2005. The effects of creatine supplementation on performance during the repeated bouts of supramaximal exercise. Journal of Sports Medicine & Physical Fitness. 45(4):507-11.

Wright GA., Grandjean PW. and Pascoe DD. The effects of creatine loading on thermoregulation and intermittent sprint exercise performance in a hot humid environment. Journal of Strength & Conditioning Research. 21(3):655-60, 2007.

Eckerson JM., Stout Jr., Moore GA, Stone NJ., Nishimura K. and Tamura K. 2004. Effect of two and five days of creatine loading on anaerobic working capacity in women. Journal of Strength & Conditioning Research. 18(1): 168-73.

Kilduff LP., Georgiades E., James N., Minnion RH., Mitchell M., Kingsmore D., Hadjicharlambous M. and Pitsiladis YP. 2004. The effects of creatine supplementation on cardiovascular, metabolic, and thermoregulatory responses during exercise in the heat in endurance-trained humans. International Journal of Sport Nutrition & Exercise Metabolism. 14 (4):443-60.

Pauly DF. and Pepine CJ. 2000. D-Ribose as a supplement for cardiac energy metabolism. Journal of Cardiovascular Pharmacology & Therapeutics. 5(4):249-58.

Eby G. and Halcomb WW. 2006. Elimination of cardiac arrhythmias using oral taurine with I-arginine with case histories: Hypothesis for nitric oxide stabilization of the sinus node. Medical Hypotheses. 67(5):1200-4.

Chowdhary S., Nuttall SL., Coote JH. and Townend JN. 2002. L-arginine augments cardiac vagal control in healthy human subjects. Hypertension. 39(1):51-6.

West SG., Ukos-Krick A., Brown P. and Mariotti F. 2005. Oral L-arginine improves hemodynamic responses to stress and reduces plasma homocysteine in hypercholesterolemic men. Journal of Nutrition. 135(2):212-7.

Smriga M., Ando T., Akutsu M., Furukawa Y., Miwa K. and Morinaga Y. 2007. Oral treatment with L-lysine and L-arginine reduces anxiety and basal cortisol levels in healthy humans. Biomedical Research. 28(2):85-90.

Ferrari R., Merli E., Cicchitelli G., Mele D., Fucili A. and Ceconi C. 2004. Therapeutic effects of L-camitine and D propionyi-L-camitine on cardiovascular diseases: a review. Annals of the New York Academy of Sciences. 1033:79-91.

Karlic H. and Lohninger A. 2004. Supplementation of L-carnitine in athletes: does it make sense? Nutrition. 20(7-8):709-15, Jul.-Aug. 2004.

Corchs F., Nutt DJ., HoodS. and Bemik M. 2009. Serotonin and sensitivity to trauma-related exposure in selective serotonin reuptake inhibitors-recovered posttraumatic stress disorder. Biological Psychiatry. 66(1):17-24.

(56) References Cited

OTHER PUBLICATIONS

Richell RA., Deakin JF. and Anderson IM. 2005. Effect of acute tryptophan depletion on the response to controllable and uncontrollable noise stress. Biological Psychiatry. 57(3):295-300.

Deijen JB., Wientjes CJ., Vullinghs HF.,Cloin PA. and Langefeld JJ. 1999. Tyrosine improves cognitive performance and reduces blood pressure in cadets after one week of a combat training course. Brain Research Bulletin. 48(2):203-9.

Kennedy DO., Little W. and Scholey AB. 2004. Attenuation of laboratory-induced stress in humans after acute administration of Melissa officinalis (Lemon Balm). Psychosomatic Medicine. 66(4):607-13.

Sawka, MN., Louise M.Burke LM., E. Randy Eichner ER., Maughan RJ, Scott J. Montain SJ. and Stachenfeld NS. 2007. Exercise and Fluid Replacement Medicine and Science in Sports and Exercise. 39:377-390.

Movafegh A., Alizadeh R., Hajimohamadi F., Esfehani F. and Nejatfar M. 2008. Preoperative oral Passiflora incamata 39 reduces anxiety in ambulatory surgery patients: a double-blind, placebo-controlled study. Anesthesia & Analgesia. 106 (6):1728-32.

Akhondzadeh S., Naghavi HR., Vazirian M., Shayeganpour A., Rashidi H. and Khani M. 2001. Passionflower in the treatment of generalized anxiety: a pilot double-blind randomized controlled trial with oxazepam. Journal of Clinical Pharmacy & Therapeutics. 26(5):363-7.

Satoh H. Kang J. 2009. Modulation by taurine of human arterial stiffness and wave reflection. Advances in Experimental Medicine & Biology. 643:.

Hua HM. Ito T. Qiu ZG. Azuma J. 2005. [Progress in research on function and mechanism of cardiac vascular system of taurine.] [Chinese] China Journal of Chinese Materia Medica. 30(9):653-8.

Fujita F., Dreyer H.C., Drummond M.J., Glynn E.L., Elena Volpi E. and Rasmussen B.B. 2009. Essential amino acid and carbohydrate ingestion before resistance exercise does not enhance postexercise muscle protein synthesis. Journal of Applied Physiolology. 106:1730-1739.

NUTRITIONAL COMPOSITIONS

CROSS-REFERENCE TO RELATED APPLICATIONS

This application is a continuation-in-part of U.S. application Ser. No. 14/054,569, filed on Oct. 15, 2013, which is a continuation of U.S. patent application Ser. No. 13/601,005, filed on Aug. 31, 2012, which claims the benefit of U.S. Provisional Application No. 61/530,339, filed on Sep. 1, 2011, all of which are incorporated herein by reference.

BACKGROUND OF THE INVENTION

Field of the Invention

The invention relates to nutritional compositions that can assist a user with one or more of maintaining cardiovascular health, reducing the stress response by mitigating the response of the cardiovascular and endocrine systems to stress, improving physical performance, speeding recovery from exertion, restoring and maintaining electrolyte balance, promoting calm, and enhancing cognitive functioning.

BACKGROUND

Firefighters, police officers, military personnel and athletes are often under stress, sometimes encountering several stressful experiences every day. Chronic stress, if unmitigated, can result in a chronic hyperaroused state that leads to the deleterious effects of stress through an epigenetic mechanism. The science of epigenetics studies the effects of environmental factors, including an individual's cognitive responses to the environment and their associated physiological effects, on the pattern of gene expression in the body. These effects on gene expression, which directly affect one's physical and mental well-being, are produced in part through methylation of DNA, which is reversible. Unmitigated stress can cause epigenetic alterations of gene expression, leading to the deleterious long-term physiological and cognitive effects of stress.

Many nutritional compositions have been created to try to optimize energy production, rehydration, and endurance. However, finding compositions that are desirable and optimal for consumption during prolonged exercise and/or exposure to stress has proven elusive.

SUMMARY OF THE INVENTION

One aspect of the embodiments disclosed herein relates to a set of beverages, and the syrup and powder from which they may be produced, that are intended to be consumed for physical and cognitive/mental preparation ("Code 2" type formulations); while on scene, during exercise, during competition, or other sustained physical exertion ("Code 3" type formulations); and for recovery between scenes/calls/exercise or competitive sessions ("Code 4" type formulations), and that are designed to reduce the physiological effects of stress.

The nutritional compositions described herein contain certain amounts of five key ingredients: creatine, freeze-dried ("instant") black tea and/or EGCG, L-carnitine, lemon balm (*Melissa officinalis*) essential oil, and passionflower (*Passiflora incarnata*) essential oil, as well as other ingredients, such as the stabilizer gum acacia, depending on the embodiment.

Embodiments also relate to methods of preparing for, enduring, and/or recovering from stress and/or exertion by consuming one or more of the compositions disclosed herein before, during, and/or after such stress and/or exertion.

Still further aspects are detailed below.

DETAILED DESCRIPTION OF THE INVENTION

Compositions described herein are formulated to be antistressors and destressors, to promote optimal cognitive performance, and to restore and maintain normal homeostasis. Furthermore, some components of the nutritional compositions herein described should help keep the body and mind prepared for, improve their performance during, and accelerate their recovery from prolonged physical exertion and/or stress.

While the examples below relate to dry compositions (e.g., powders) and liquid beverage formulations, where powders are mixed with water or another aqueous medium, other embodiments for the nutritional compositions described herein could include energy bars where a binder is included and is in the form of chocolate, oats, wheat, peanut butter, semi-dried fruits, grains and combinations thereof. Moreover, a gel composition may be utilized, where the dry power composition is mixed with a viscous liquid "gel base" (such as a syrup) until a gel consistency is formed.

Although the invention has been described with reference to various compositions, it will be appreciated that various changes and modifications may be made without departing from the invention. The examples below are provided to better illustrate the invention and are not intended to limit the scope of the invention.

Non-Limiting Examples

A nutritional composition, termed "Code 2a," for reducing stress and certain other benefits, is created by mixing creatine, freeze-dried ("instant") black tea, L-carnitine, gum acacia, lemon balm (*Melissa officinalis*) essential oil, passionflower (*Passiflora incarnata*) essential oil, and taurine; with the total osmolarity of the final beverage (if in liquid form) not exceeding that of human blood plasma. In one embodiment, Code 2a includes in parts by weight, based on a total of 430-4300 parts by weight of the dry substance: creatine 150-1500; freeze-dried ("instant") black tea 50-500; gum acacia 10-100; L-carnitine 100-1000; lemon balm (*Melissa officinalis*) essential oil, 10-100; passionflower (*Passiflora incarnata*) essential oil 10-100; and taurine 100-1000 parts.

By way of example, a beverage can be created in which 400 mg taurine is dissolved in 300 ml distilled water and brought to 355 ml. Disperse 100 mg of the gum acacia in this solution by vigorous stirring at high shear for a period of 3 minutes. Add 50 µl each of the lemon balm and passionflower essential oils over the course of 30 seconds with vigorous stirring at high shear to create an emulsion, followed by another 3 minutes of vigorous stirring of the emulsion at high shear. Homogenize solution for 5 minutes in a microfluidizer. Next, 1.2 g creatine, 210 mg freeze-dried ("instant") black tea, and 400 mg L-carnitine are introduced into the solution with gentle shaking immediately before the beverage is consumed, thus preserving the efficacy of the creatine and tea.

A nutritional composition, termed "Code 2b," has been created with creatine, freeze-dried ("instant") black tea, gum acacia, L-carnitine, lemon balm (*Melissa officinalis*) essential oil, passionflower (*Passiflora incarnata*) essential oil, taurine, L-arginine and L-lysine; with the total osmolarity of the final beverage (if in liquid form) not exceeding that of human blood plasma. In one embodiment, the L-arginine and L-lysine components are included in a weight ratio of 1:1. By way of example, the composition includes, in parts by weight based on a total of 630-6300 parts by weight of the dry substance, of: creatine, 150-1500; freeze-dried ("instant") black tea, 50-500; gum acacia, 10-100; L-carnitine, 100-1000; lemon balm (*Melissa officinalis*) essential oil, 10-100; passionflower (*Passiflora incarnata*) essential oil, 10-100; taurine, 100-1000; L-arginine, 100-1000; and L-lysine, 100-1000.

A beverage may be made in which 400 mg taurine, 600 mg L-arginine and 600 mg L-lysine are dissolved in 300 ml distilled water and brought to 355 ml. Disperse 100 mg of the gum acacia in this solution by vigorous stirring at high shear for a period of 3 minutes. Add 50 µl each of the lemon balm and passionflower essential oils over the course of 30 seconds with vigorous stirring at high shear to create an emulsion, followed by another 3 minutes of vigorous stirring of the emulsion at high shear. Homogenize for 5 minutes in a microfluidizer. Next, 1.2 creatine, 210 mg freeze-dried ("instant") black tea and 400 mg L-carnitine are introduced into the solution with gentle shaking immediately before the beverage is consumed, thus preserving the efficacy of the creatine and tea.

A nutritional composition, termed "Code 2c," has been created that includes creatine, freeze-dried ("instant") black tea, gum acacia, L-carnitine, lemon balm (*Melissa officinalis*) essential oil, passionflower (*Passiflora incarnata*) essential oil, taurine, L-arginine, L-lysine, L-tyrosine and L-tryptophan; with the total osmolarity of the final beverage (if in liquid form) not exceeding that of human blood plasma. Preferably, the L-arginine and L-lysine components are in a weight ratio of 1:1.

In one embodiment, and based on a total of 670-7600 parts by weight of the dry substance, the composition includes creatine, 150-1500; freeze-dried ("instant") black tea, 50-500; gum acacia, 10-100, L-carnitine, 100-1000; lemon balm (*Melissa officinalis*) essential oil, 10-100; passionflower (*Passiflora incarnata*) essential oil, 10-100; taurine, 100-1000; L-arginine, 100-1000; L-lysine, 100-1000; L-tyrosine, 30-300; and L-tryptophan, 10-1000.

A beverage may be made in which 400 mg taurine, 600 mg L-arginine, 600 mg L-lysine, 200 mg L-tyrosine and 100 mg L-tryptophan are dissolved in 300 ml distilled water and brought to 355 ml. Disperse 100 mg of the gum acacia in this solution by vigorous stirring at high shear for a period of 3 minutes. Add 50 µl each of the lemon balm and passionflower essential oils over the course of 30 seconds with vigorous stirring at high shear to create an emulsion, followed by another 3 minutes of vigorous stirring of the emulsion at high shear. Homogenize for 5 minutes in a microfluidizer. Next, 1.2 g creatine, 210 mg freeze-dried ("instant") black tea and 400 mg L-carnitine are introduced into the solution with gentle shaking immediately before the beverage is consumed, thus preserving the efficacy of the creatine and tea.

A composition, termed "Code 2d," has been created with creatine, freeze-dried ("instant") black tea, gum acacia, L-carnitine, lemon balm (*Melissa officinalis*) essential oil, passionflower (*Passiflora incarnata*) essential oil, taurine, L-arginine, L-lysine, L-tyrosine, L-tryptophan, citric acid and D-ribose; with the total osmolarity of the final beverage (if in liquid form) not exceeding that of human blood plasma. The composition, in one embodiment, includes in parts by weight, based on a total of 830-9200 parts by weight of the dry substance, creatine, 150-1500; freeze-dried ("instant") black tea, 50-500; gum acacia 10-100; L-carnitine, 100-1000; lemon balm (*Melissa officinalis*) essential oil, 10-100; passionflower (*Passiflora incarnata*) essential oil, 10-100; taurine, 100-1000; L-arginine, 100-1000; L-lysine, 100-1000; L-tyrosine, 30-300; L-tryptophan, 10-1000; citric acid, 60-600; and D-ribose 100-1000.

A beverage may be made in which 400 mg taurine, 600 mg L-arginine, 600 mg L-lysine, 200 mg L-tyrosine 100 mg L-tryptophan, 540 mg citric acid and 800 mg D-ribose are dissolved in 300 ml distilled water and brought to 355 ml. Disperse 100 mg of the gum acacia in this solution by vigorous stirring at high shear for a period of 3 minutes. Add 50µ. 1 each of the lemon balm and passionflower essential oils over the course of 30 seconds with vigorous stirring at high shear to create an emulsion, followed by another 3 minutes of vigorous stirring of the emulsion at high shear. Homogenize for 5 minutes in a microfluidizer. Next, 1.2 g creatine, 210 mg freeze-dried ("instant") black tea and 400 mg L-carnitine are introduced into the solution with gentle shaking immediately before the beverage is consumed, thus preserving the efficacy of said creatine and tea.

A nutritional composition, termed "Code 2e," has been created with freeze-dried ("instant") black tea, calcium chloride, calcium pantothenate, biotin, citric acid, creatine, cyanocobolamine, D-ribose, folic acid, gum acacia, green tea extract, low DE maltodextrin, L-arginine, L-carnitine, L-histidine, L-isoleucine, L-leucine, L-lysine, L-methionine, L-phenylalanine, L-threonine, L-tryptophan, L-tyrosine, L-valine, lemon balm (*Melissa officinalis*) essential oil, magnesium chloride, nicotinic acid, passionflower (*Passiflora incarnata*) essential oil, potassium chloride, pyridoxal HCL, riboflavin, sodium chloride, taurine, and thiamin; with the total osmolarity of the final beverage (if in liquid form) not exceeding that of human blood plasma. Preferably, the L-histidine, L-isoleucine, L-leucine, L-lysine, L-methionine, L-phenylalanine, L-threonine, and L-valine are comprised in a weight ratio of 1:1:1:4.375:1.5:0.375:1:1.25.

In one embodiment, the composition contains, in parts by weight based on a total of 2,354-24,841 parts by weight of the dry substance, calcium chloride, 100-1000; calcium pantothenate, 0.1-1; biotin, 0.0006-0.06; citric acid, 60-600; creatine, 150-1500; cyanocobalamin, 0.001-0.1; D-ribose, 100-1000; freeze-dried ("instant") black tea, 50-500; folic acid, 0.01-0.1; gum acacia, 10-100; low DE maltodextrin 500-5000; L-arginine, 100-1000; L-carnitine, 100-1000; L-histidine 100-1000; L-isoleucine, 100-1000; L-leucine, 200-2000; L-lysine, 100-1000; L-methionine, 100-1000; L-phenylalanine, 100-1000; L-threonine, 100-1000; L-tryptophan, 10-1000; L-tyrosine, 30-300; L-valine, 100-1000; lemon balm (*Melissa officinalis*) essential oil, 10-100; magnesium chloride, 10-100; nicotinic acid, 1-10; passionflower (*Passiflora incarnata*) essential oil, 10-100; potassium chloride, 10-500; pyridoxal HCl, 1-10; riboflavin, 1-10; sodium chloride, 100-1000; taurine, 100-1000; and thiamin 1-10.

A beverage may be created. As an example, dissolve 580 mg $CaCl_2.2H_2O$, 1 mg calcium pantothenate, 6 μg biotin, 540 mg citric acid, 10 μg cyanocobalamin, 800 mg D-ribose, 40 μg folic acid, 1 g low DE maltodextrin, 600 mg L-arginine, 320 mg L-histidine, 320 mg L-isoleucine, 1.4 μm L-leucine, 600 mg L-lysine, 120 mg L-methionine, 560 mg L-phenylalanine, 320 mg L-threonine, 100 mg L-tryptophan, 200 mg L-tyrosine, 400 mg L-valine, 33.8 mg $MgCl_2.6H_2O$, 3.2 mg nicotinic acid, 7 mg pyridoxal HCl, 5 mg riboflavin, 400 mg taurine and 7 mg thiamin in 300 ml distilled water and bring to 355 ml. Disperse 100 mg of the gum acacia in this solution by vigorous stirring at high shear for a period of 3 minutes. Add 50 μl each of the lemon balm and passionflower essential oils over the course of 30 seconds with vigorous stirring at high shear to create an emulsion, followed by another 3 minutes of vigorous stirring of the emulsion at high shear. Homogenize for 5 minutes in a microfluidizer. Next, 1.2 g creatine, 210 mg freeze-dried ("instant") black tea and 400 mg L-carnitine are introduced into the solution with gentle shaking immediately before the beverage is consumed, thus preserving the efficacy of the creatine and tea.

A nutritional composition, termed "Code 3," has been created that contains a low DE maltodextrin, creatine, freeze-dried ("instant") black tea, gum acacia, lemon balm (*Melissa officinalis*) essential oil, passionflower (*Passiflora incarnata*) essential oil, magnesium chloride and sodium chloride. In one embodiment, based on a total of 5,340-33,400 parts by weight of the dry substance, the composition includes low DE maltodextrin, 5,000-30,000; creatine, 150-1500; freeze-dried ("instant") black tea, 50-500; gum acacia, 10-100; lemon balm (*Melissa officinalis*) essential oil, 10-100; Passion Flower (*Passiflora incarnata*) essential oil, 10-100; magnesium chloride 10-100; and sodium chloride, 100-1000 parts.

A beverage may be created in which 10.65 g of low DE maltodextrin, 28.6 mg $MgCl_2.6H_2O$ and 1.657 g NaCl are dissolved in 300 ml distilled water and brought to 355 ml. Disperse 100 mg of the gum acacia in this solution by vigorous stirring at high shear for a period of 3 minutes. Add 50 μl each of the lemon balm and passionflower essential oils over the course of 30 seconds with vigorous stirring at high shear to create an emulsion, followed by another 3 minutes of vigorous stirring of the emulsion at high shear. Homogenize for 5 minutes in a microfluidizer. Next, 400 mg L-carnitine, 1.2 g creatine and 210 mg freeze-dried ("instant") black tea are introduced with gentle shaking immediately before the beverage is consumed, thus preserving the efficacy of the creatine and tea.

A nutritional composition, termed "Code 4," has been created that contains a low DE maltodextrin, black tea extract, creatine, gum acacia, lemon balm (*Melissa officinalis*) essential oil, PassionFlower (*Passiflora incarnata*) essential oil, magnesium chloride, potassium chloride and sodium chloride. The composition includes, based on a total of 5,200-21,920 parts by weight of the dry substance, low DE maltodextrin, 5,000-20,000; freeze-dried ("instant") black tea, 50-500; gum acacia, 10-100; lemon balm (*Melissa officinalis*) essential oil, 10-100; Passion Flower (*Passiflora incarnata*) essential oil, 10-100; magnesium chloride 10-20; potassium chloride, 10-100; and sodium chloride, 100-1000 parts.

A beverage may be created in which 10.65 g low DE maltodextrin, 28.6 mg $MgCl_2.6H_2O$, 62.1 mg $CaCl_2.2H_2O$, 52.5 mg KCl and 617 mg NaCl are dissolved in 300 ml distilled water and brought to 355 mi. Disperse 100 mg of the gum acacia in this solution by vigorous stirring at high shear for a period of 3 minutes. Add 50 μl each of the lemon balm and passionflower essential oils to the solution over the course of 30 seconds with vigorous stirring at high shear to create an emulsion, followed by another 3 minutes of vigorous stirring of the emulsion at high shear. Homogenize for 5 minutes in a microfluidizer. Next, 1.2 g creatine, 210 mg freeze-dried ("instant") black tea and 400 mg L-carnitine are introduced with gentle shaking immediately before the beverage is consumed, thus preserving the efficacy of the creatine and tea.

By way of further example, variations of the nutritional compositions above may include EGCG (epigallocatechin-3-gallate) in place of or in addition to black tea. Thus, for example, a composition termed "Code 2V" (for variation) is a variation on the composition termed "Code 2a" above and is created by mixing creatine, EGCG, L-carnitine, gum acacia, lemon balm (*Melissa officinalis*) essential oil, passionflower (*Passiflora incarnata*) essential oil, and taurine; with the total osmolarity of the final beverage (if in liquid form) not exceeding that of human blood plasma. Thus, in one embodiment, Code 2a includes in parts by weight, based on a total of 430-4300 parts by weight of the dry substance: creatine 150-1500; EGCG 5-500; gum acacia 10-100; L-carnitine 100-1000; lemon balm (*Melissa officinalis*) essential oil, 10-100; passionflower (*Passiflora incarnata*) essential oil 10-100; and taurine 100-1000 parts.

A Code 2V beverage can be created in which 400 mg taurine is dissolved in 300 ml distilled water and brought to 355 ml. Disperse 100 mg of the gum acacia in this solution by vigorous stirring at high shear for a period of 3 minutes. Add 50 μl each of the lemon balm and passionflower essential oils over the course of 30 seconds with vigorous stirring at high shear to create an emulsion, followed by another 3 minutes of vigorous stirring of the emulsion at high shear. Homogenize solution for 5 minutes in a microfluidizer. Next, 1.2 g creatine, 50 mg EGCG, and 400 mg L-carnitine are introduced into the solution with gentle shaking immediately before the beverage is consumed, thus preserving the efficacy of the creatine and EGCG.

As guided by the forgoing, EGCG may be substituted for black tea in any of the "code" formulations.

Study

A pilot study was conducted among firefighters and a Code 2 beverage (Code 2V) to determine whether there exists coaction among the components of the beverage to reduce physiological stress resulting in well-being. One aspect of the study was an objective measure of two physiological biomarkers of stress: salivary cortisol and alpha-amylase. The other aspect was a subjective measure, utilizing an adapted version of the NASA Task Load Index, to gauge the participants' perceptions of various aspects of the workday and their well-being. The major findings were: (1) Code 2V showed a pronounced ability to reduce cortisol, and to moderate the rise of alpha-amylase, when stress led to high values. (2) Code 2V prevented psychological stress, as assessed by the NASA survey, from manifesting as physiological stress. (3) Participant feedback manifested a strong enhancement of mental and physical well-being. The results showed that Code 2V has a coaction among its components culminating in reduction of elevated cortisol and alpha-amylase levels.

Stress and overexertion were the contributing factors in 66.7% of all firefighter deaths in 2015 (US Fire Administration, 2016). The majority of these deaths were cardiovascular and occurred after responding to an incident. Although there were only 90 deaths in 2015, many diseases and health issues among firefighters go unaccounted. Furthermore, attention lapses and microsleep due to a lack of sleep or sleep interruption have been linked to endocrine disruption, mood changes, and a higher increase of accidents.

Prior work showed that chronic stress, if unmitigated, may through epigenetic mechanisms result in a chronic hyperaroused state that leads to the disease-producing long-term physiological and cognitive effects of stress. Research has shown that high cortisol levels within the hypothalamic-pituitary-adrenal (HPA) Axis and sympathetic activity in the hypothalamic-pituitary-thyroid (HPT or Thyroxin) axis have been linked to these deleterious effects.

There are no beverage combinations or formulations that are currently being used in the fire service to reduce stress hormones, only beverages that are used for rehydration. Due to the demands of the job, firefighters, law enforcement officers, military members, and medical personnel are on a biological roller coaster due to job stress. Thus, we have invented compositions and beverages formulated for work performance, cognitive function, stress hormone reduction, and sleep. The formulations have been called Code 2 to reflect first responder language of normal traffic that is presented in this study to prepare firefighters for a critical incident.

This pilot study targeted three objectives. The first was to see if Code 2 formulations (e.g., Code 2V) would lead to a significant reduction of physiological stress, as indicated by two biomarkers of stress, salivary cortisol (HPA axis) and alpha-amylase (Thyroxin Axis). The second was to see if the beverage would improve the participants' perception of their work experience. Achievement of these objectives would indicate a coaction among the beverage's components.

Methodology: This study consisted of a mixed research design, in which quantitative measurements of cortisol and alpha-amylase (AA) as physiological markers of stress were combined with a qualitative survey and questions designed to assess perception of their work experience. Three firefighters agreed to participate in this pilot study during the first three 24 hour shifts of their tour (which were separated by 24 hours off). They were not informed of the purpose of the study. These participants collected saliva samples for simultaneous cortisol and AA assays, used as physiological biomarkers of the stress response, on all three days. The firefighters were also given the NASA survey to measure psychological stress during each of their first three shifts after 2 pm, and were additionally asked to "Please note any information that you want us to know about." The participants were asked to ingest the Code 2V beverage on the second day of their tour. The schedule was as follows:

First Day of Tour
10:00 am
Rinse mouth with water
Wait 10 minutes
Collect saliva as per instructions and freeze
2:00 pm or one hour after lunch, whichever is later
Rinse mouth with water
Wait 10 minutes
Collect saliva as per instructions and freeze
Take NASA survey
Second Day of Tour
10:00 am
Rinse mouth with water
Wait 10 minutes
Collect saliva as per instructions and freeze
10:15-1:30 pm or next three hours drink five 8 oz bottles of Code 2V
2:00 pm or one hour after lunch, whichever is later
Rinse mouth with water
Wait 10 minutes
Collect saliva as per instructions and freeze
Take NASA survey
Third Day of Tour
10:00 am
Rinse mouth with water
Wait 10 minutes
Collect saliva as per instructions and freeze
2:00 pm or one hour after lunch, whichever is later
Rinse mouth with water
Wait 10 minutes
Collect saliva as per instructions and freeze
Take NASA survey Saliva collection was performed using a collection kit purchased from Salimetrics, Inc., State College, Pa. The saliva collection times were chosen to be at least one hour after breakfast or lunch. This, plus rinsing of the mouth with water 10 minutes before collection, were done to avoid compromising the cortisol and AA assays. The samples were frozen within a few minutes after collection. At the end of the trial, the samples were shipped overnight on dry ice to the Salimetrics' Laboratory in Carlsbad, Calif., for analysis.

The NASA Task Load Index is an instrument developed by the Human Performance Research Group of NASA's Ames Research Center to gauge the subject's perception of various mental, physical, and temporal demands, along with performance, effort, and frustration levels, associated with the workday. A common modification, elimination of the weighting process, was used in this study. The participants filled out the form on the afternoon of each day.

Results and Discussion: The results of the Salimetrics cortisol analyses are shown in Table 1 and FIG. 1, and of the AA analyses in Table 2 and FIG. 2. The results of the NASA Task Load Index are shown in Table 3 and FIG. 3. In the tables and graphs, S1AM=morning of shift one, S1PM=afternoon of shift one, etc.

Statistical analysis of the Salimetrics cortisol and AA data. In the absence of stress, cortisol levels normally decrease and AA levels normally rise smoothly during the course of the day, while stress may increase both to high levels. As noted in the introduction, the purpose of this study was to determine whether Code 2V would mitigate high cortisol levels, lower normal cortisol levels, and reduce the rise in AA. The study data was analyzed using paired sample t-tests of the average of the participants' shift 1 values minus the corresponding shift 2 and shift 3 averages, for both the morning (AM) and afternoon (PM).

For example, a paired t-test was performed on the Shift 1 AM average (S1AM) minus the Shift 3 AM (S3AM) average for cortisol and for AA. These results for cortisol are shown in are shown in Table 1, and those for AA in Table 2. The results were in the hypothesized direction (a reduction) for all of the cortisol and AA pairings except the S1PM-S3PM ones. Since most of the results were in the expected direction, power analyses were performed to determine the number of participants that would be required to obtain a significant result for all of the pairings that showed a reduction. These results are shown in Table 4; the relatively low numbers indicate that the data is significant enough to warrant further study. A Pearson Product Moment Correlation showed no significant correlation between the cortisol and AA results, as has been noted in studies elsewhere. Altogether the statistical results suggest that the effect of Code 2V is real within natural variation.

TABLE 1

Cortisol results, mean of two analyses, μg/dL

| Sample ID | A | B | C |
|---|---|---|---|
| S1AM | 0.178 | 0.113 | 0.097 |
| S1PM | 0.168 | 0.086 | 0.055 |
| S2AM | 0.341 | 0.045 | 0.072 |
| S2PM | 0.182 | 0.041 | 0.087 |
| S3AM | 0.199 | 0.081 | 0.071 |
| S3PM | 0.185 | 0.056 | 0.071 |

TABLE 2

AA results, U/ml

| Sample ID | A | B | C |
|---|---|---|---|
| S1AM | 168.6 | 150.6 | 410.7 |
| S1PM | 90.2 | 65.9 | 511.7 |
| S2AM | 140.7 | 81.0 | 360.8 |
| S2PM | 87.2 | 49.2 | 306.4 |
| S3AM | 64.0 | 193.5 | 383.1 |
| S3PM | 77.7 | 60.4 | 439.5 |

TABLE 3

NASA Task Load Index results by question and shift day

| Participant | Shift day | Q1 | Q2 | Q3 | Q4 | Q5 | Q6 | Average Rating |
|---|---|---|---|---|---|---|---|---|
| A | S1 | 16.5 (17) | 13.5 (14) | 16.5 (17) | 15.5 (16) | 5.5 (6) | 19.5 (20) | 15.0 |
|   | S2 | 19.5 (20) | 11.5 (12) | 17.5 (18) | 16.5 (17) | 16.5 (17) | 15.5 (16) | 16.7 |
|   | S3 | 16.5 (17) | 9.5 (10) | 18.5 (19) | 15.5 (16) | 7.5 (8) | 16.5 (17) | 14.5 |
| B | S1 | 12.5 (13) | 9.5 (10) | 9.5 (10) | 16.5 (17) | 12.5 (13) | 9.5 (10) | 12.2 |
|   | S2 | 14.5 (15) | 10.5 (11) | 12.5 (13) | 14.5 (15) | 9.5 (10) | 15.5 (16) | 13.3 |
|   | S3 | 7.5 (8) | 10.5 (11) | 9.5 (10) | 9.5 (10) | 11.5 (12) | 13.5 (14) | 10.8 |
| C | S1 | 9.5 (10) | 15.5 (16) | 15.5 (16) | 16.5 (17) | 12.5 (13) | 12.5 (13) | 14.2 |
|   | S2 | 7.5 (8) | 15.5 (16) | 10.5 (11) | 17.5 (18) | 15.5 (16) | 8.5 (9) | 13.0 |
|   | S3 | 14.5 (15) | 13.5 (14) | 15.5 (16) | 11.5 (12) | 16.5 (17) | 14.5 (15) | 14.8 |

TABLE 4

Number of participants required to reach significance
Number of observations needed for significance

| Shift pairs | Cortisol | AA |
|---|---|---|
| S1AM-S3AM | 36 | 40 |
| S2AM-S3AM | 45 | — |
| S1PM-S2PM | — | 16 |
| S1PM-S3PM | — | 11 |

Figure 1:
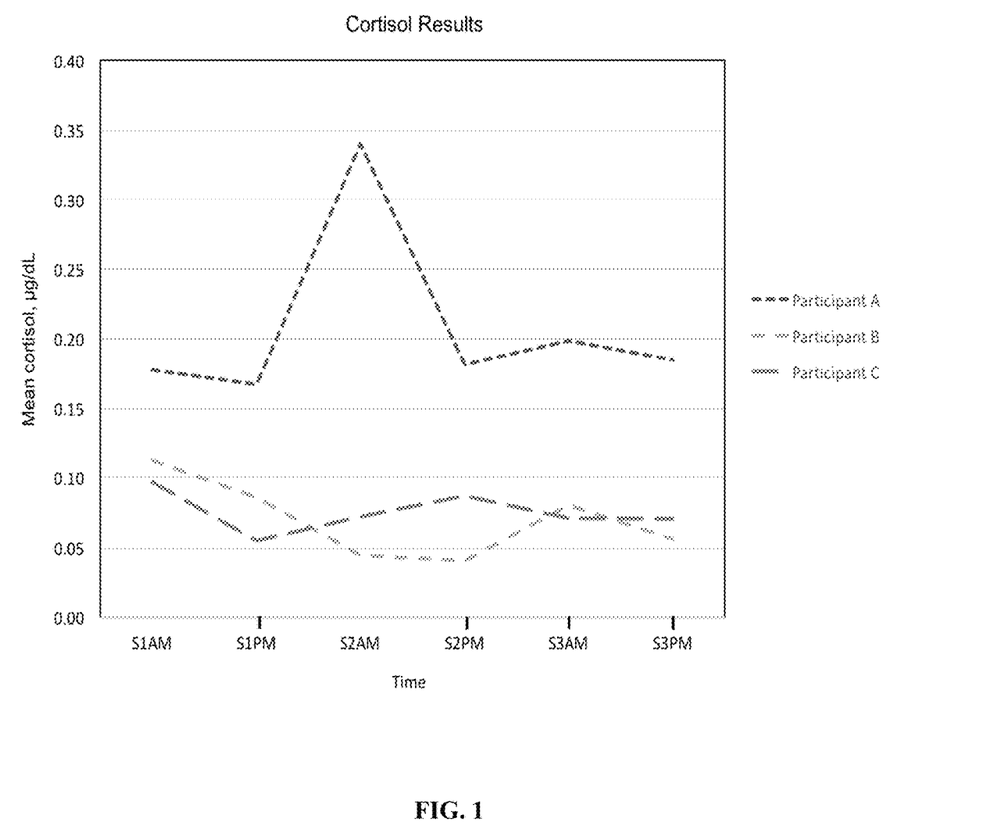
FIG. 1 depicts cortisol levels (means of two analyses) plotted by shift day for participants A, B and C. S1AM=morning of shift one, S1PM=afternoon of shift one, etc.

Graphical presentation of the cortisol results. Cortisol results: As seen in FIG. 1, Participant A (a firefighter paramedic in one of his agency's busiest fire stations, in which calls are run all day and all night) had a consistently high level of cortisol over all three shifts, indicative of a high stress over the study period. Nevertheless, on the second shift day (S2AM and S2PM in FIG. 1), Code 2V ingestion substantially reduced the level of cortisol. Participant A reported sleeping better and reported better optimum levels of performance.

Participant B worked at a moderately slow station and runs a full-time construction business on his days off. He reported that he slept better and saw an increase in his work productivity on his second shift. These benefits continued the next day, when he was off shift and worked in his construction business.

Figure 2:
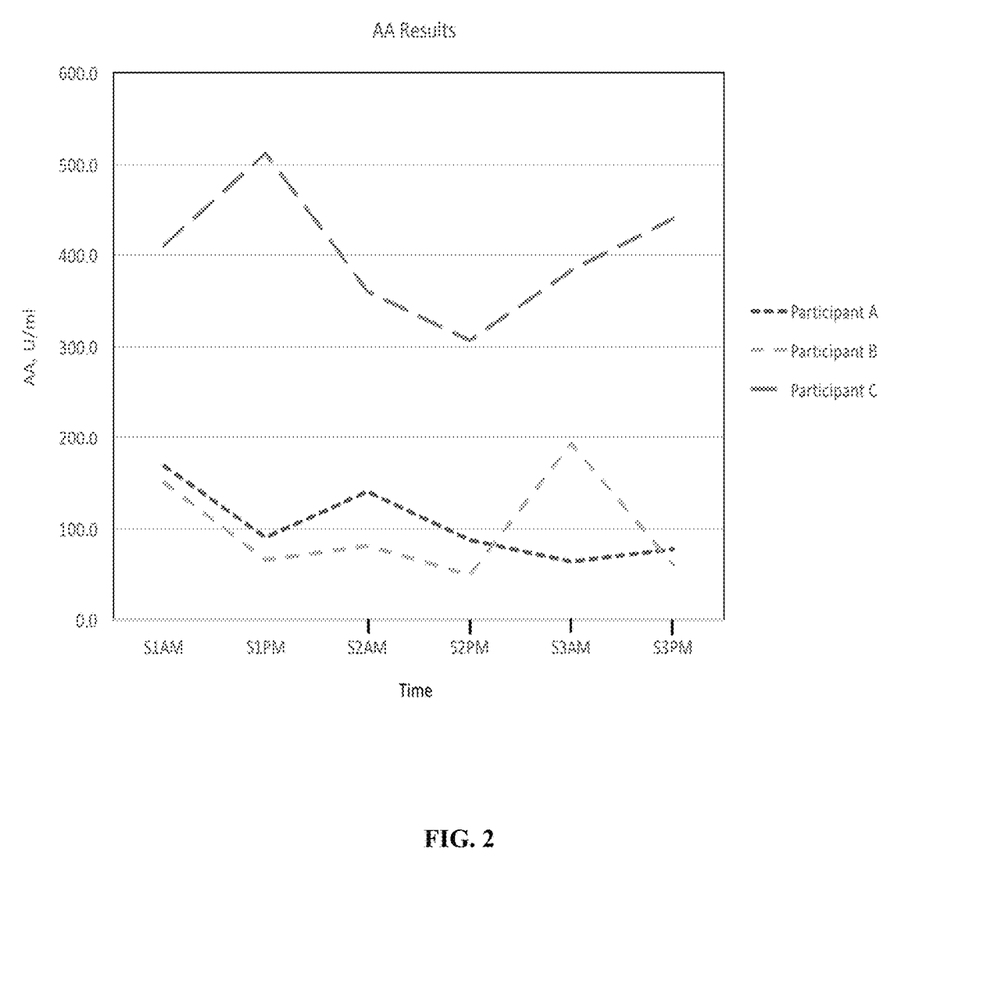
FIG. 2 shows alpha-amylase (AA) levels plotted by shift day for participants A, B and C. S1AM=morning of shift one, S1PM=afternoon of shift one, etc.
Figure 3:
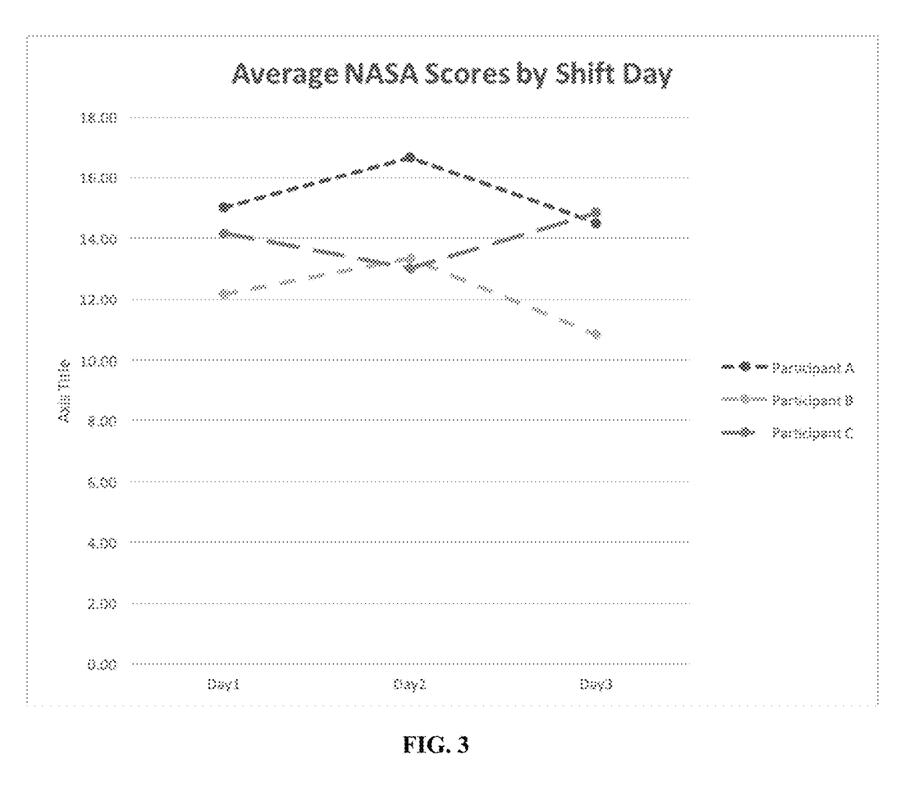
FIG. 3 illustrates the average score over all NASA Task Load Index questions for each participant on each shift day.

Graphical presentation of the AA results. AA results: As seen in FIG. 2, participant C (a firefighter paramedic who was also the public information officer, in which capacity he responded to all of his agencies' trauma calls) had a consistently high level of AA over all three shifts, indicative of chronic stress in due to psychosocial trauma. Nevertheless, on the second shift day (S2AM and S2PM in FIG. 2), Code 2V ingestion substantially reduced the rise in the level of AA; the effect seemed to carry over into the third shift day. Participant C reported that he not only slept better, but he also felt better and was able to function more productively on his next day off, increasing his optimum levels of performance. In fact, when informed of his high AA levels, participant C requested more Code 2 beverages.

NASA Task Load Index results. Table 3 shows the Ratings for all questions for each participant on each shift day, with the Average Rating for each day in the rightmost column. The Average Ratings for participants A and B for day 2 were higher relative to days 1 and 3, indicative of a decline in the perceived work experience. Nonetheless this increase of psychological stress is not reflected in their cortisol or AA levels after ingestion of Code 2V—psychological stress did not lead to physiological stress.

Participant Observations. The participants provided observations which coincided with the physiological effects of the Code 2 beverage.

On the day of ingesting Code 2V, participants reported increased levels of functionality and optimum levels of work performance. They also reported a more restful sleep while on shift, even upon awaking by 911 Fire Alarm throughout the night.

On the day after Code 2V ingestion, all three participants reported feeling more rested and energized than they had in a long time, not just collapsing into bed as soon as they got home, and sleeping better that night. Participant A noted that they had the energy to do household repairs. Participant B, who worked at a very slow station but had a stressful second job, noted that they had more energy to get more work done, with better functionality and performance on their second job. Participant C noted that they had the energy to get more work done at home, and even requested more of the beverage. All three participants also reported clearer thinking and better decision making.

The participants' observations indicated an overall reduction in stress and increased well-being. The participants' observations of having "more energy" were particularly remarkable, since Code 2V does not contain a stimulant, and the effects were also noted on the day after Code 2V ingestion, another indication that the effects of Code 2V carry over into subsequent days. The physiological data of the participants indicated this effect, as well.

CONCLUSIONS

The cortisol and alpha-amylase results show that Code 2V had a coaction among its components that culminated in a reduction of elevated cortisol and a moderation of the rise of alpha-amylase levels in individuals with high levels of acute or chronic stress. The results of the NASA survey indicated that an increase of psychological stress did not manifest as physiological stress after ingestion of Code 2V. The variety of observational effects reported by the participants, which indicated an improvement in their optimum levels of functioning and performance and their mental and physical well-being, were previously not known to be produced by any single component or combination of the components of Code 2V, and therefore demonstrated an unexpected coaction of the Code 2V components. The results have demonstrated that the coaction of the Code 2V components promoted reduction of stress physiologically amongst the participants with the observation of improved functionality and without the participants knowing the purpose of the formulation.

The claims are not to be limited to the embodiments and examples disclosed herein.

What is claimed is:

1. A nutritional composition provided together for consumption before exertion, comprising:
    based on a total of 430-4300 parts by weight of the dry substance, a formulation including creatine 150-1500, EGCG 5-500, gum acacia 10-100, L-carnitine 100-1000, lemon balm (*Melissa officinalis*) essential oil, 10-100, passionflower (*Passiflora incarnata*) essential oil 10-100, and taurine 100-1000 parts.

2. A beverage including composition of claim 1 dissolved in an aqueous medium.

3. The composition of claim 1, further including L-arginine 100-1000 parts and L-lysine 100-1000 parts, wherein said total parts by weight is increased to 630-6300.

4. A beverage including the composition of claim 3 dissolved in an aqueous medium.

5. The composition as set forth in claim 3, wherein said L-arginine and L-lysine are in a ratio of 1:1.

6. A set of nutritional compositions provided for consumption before, during, and after exertion, comprising:
    a first formulation, based on a total of 670-7600 parts by weight of each of the following dry ingredients, comprising: creatine 150-1500 parts, EGCG 50-500 parts, gum acacia 10-100 parts, L-carnitine 100-1000 parts, lemon balm (*Melissa officinalis*) essential oil 10-100 parts, passionflower (*Passiflora incarnata*) essential oil 10-100 parts, taurine 100-1000 parts, L-arginine 100-1000 parts, L-lysine 100-1000 parts, L-tyrosine 30-300 parts, and L-tryptophan 10-1000 parts,
    a second formulation, based on a total of 5,340-33,400 parts by weight of the dry substance, of low DE maltodextrin, 5,000-30,000, creatine, 150-1500, EGCG, 50-500, gum acacia, 10-100, lemon balm (*Melissa officinalis*) essential oil, 10-100, Passion Flower (*Passiflora incarnata*) essential oil, 10-100, magnesium chloride 10-100, and sodium chloride, 100-1000 parts; and
    a third formulation, based on a total of 5,200-21,920 parts by weight of the dry substance, of low DE maltodextrin, 5,000-20,000, EGCG, 50-500, gum acacia, 10-100, lemon balm (*Melissa officinalis*) essential oil, 10-100, Passion Flower (*Passiflora incarnata*) essential oil, 10-100, magnesium chloride 10-20, potassium chloride, 10-100, and sodium chloride, 100-1000 parts.

7. A beverage including the composition of claim 6 dissolved in an aqueous medium.

8. The composition of claim 6, further including in the first formulation citric acid 60-600 parts and D-ribose 100-1000 parts, wherein said total parts by weight is increased to 830-9200.

9. A beverage including the composition of claim 8 dissolved in an aqueous medium.

10. A method of reducing stress by consuming before exertion a beverage, comprising:
    consuming prior to exertion a formulation based on a total of 430-4300 parts by weight of the dry substance, the formulation including creatine 150-1500, EGCG 5-500, gum acacia 10-100, L-carnitine 100-1000, lemon balm (*Melissa officinalis*) essential oil, 10-100, passionflower (*Passiflora incarnata*) essential oil 10-100, and taurine 100-1000 parts, wherein said composition is dissolved in an aqueous medium.

11. The method of claim 10, further including consuming a set of beverages during and after exertion, comprising the steps of:
    consuming during exertion a second formulation, based on a total of 5,340-33,400 parts by weight of the dry substance, of low DE maltodextrin, 5,000-30,000, creatine, 150-1500, EGCG, 50-500, gum acacia, 10-100, lemon balm (*Melissa officinalis*) essential oil, 10-100, Passion Flower (*Passiflora incarnata*) essential oil, 10-100, magnesium chloride 10-100, and sodium chloride, 100-1000 parts; and
    consuming after exertion a third formulation, based on a total of 5,200-21,920 parts by weight of the dry substance, of low DE maltodextrin, 5,000-20,000, EGCG, 50-500, gum acacia, 10-100, lemon balm (*Melissa officinalis*) essential oil, 10-100, Passion Flower (*Passiflora incarnata*) essential oil, 10-100, magnesium chloride 10-20, potassium chloride, 10-100, and sodium chloride, 100-1000 parts,
    wherein each formulation is dissolved in an aqueous medium.

* * * * *